United States Patent [19]

Malburg

[11] 3,801,029

[45] Apr. 2, 1974

[54] METHOD OF WINDING A TRANSFORMER

[75] Inventor: Dieter Malburg, Hamburg, Germany

[73] Assignee: U.S. Philips Corporation, New York, N.Y.

[22] Filed: Jan. 20, 1972

[21] Appl. No.: 219,444

[30] Foreign Application Priority Data

Feb. 10, 1971 Germany.......................... 2106258

[52] U.S. Cl............... 242/7.03, 242/7.08, 242/7.09, 242/7.11

[51] Int. Cl........................................... H01f 41/06

[58] Field of Search ....... 242/7.03, 7.08, 7.09, 7.11, 242/7.19; 29/605; 336/15

[56] References Cited

UNITED STATES PATENTS

| | | | |
|---|---|---|---|
| 3,106,351 | 10/1963 | Fulton | 242/7.09 X |
| 2,559,824 | 7/1951 | Leland | 242/7.03 X |

*Primary Examiner*—Billy S. Taylor
*Attorney, Agent, or Firm*—Frank R. Trifari

[57] ABSTRACT

A method of winding a transformer is disclosed, such a transformer being particularly useful as an isolating transformer for use between a television receiver and an image recording apparatus. The primary and secondary coils are wound one over the other with insulating intermediate layers, at least one primary layer and at least one secondary layer being alternately wound on to a winding mandril. An intermediate layer of insulating material is then applied as a cover and an auxiliary winding is wound adjacent to transformer being wound with the wire of a previous layer of turns during the winding of the next layer onto said previous layer. The wire of the auxiliary winding is used for winding a subsequent layer of turns onto the transformer.

5 Claims, 8 Drawing Figures

METHOD OF WINDING A TRANSFORMER

Figure 1:
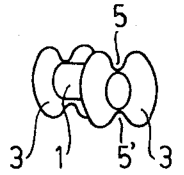

The invention relates to a method of winding a transformer, in particular an isolating transformer for use between a television receiver and an image-recording apparatus (video recorder), in which primary and secondary coils are wound, one over the other with insulating intermediate layers, and to a device for performing this method.

The adaptation of television receivers to video recorders requires galvanic isolation of the television receiver and the recorder. This international safety requirement is based on the fact that the chassis of a television receiver is connected to the mains, whilst the chassis of a recorder is grounded. A particularly advantageous adaptation is obtained by connecting the receiver and the recorder to each other for voltages of video frequency by means of an isolating transformer having a large band width.

For obtaining a low lower cut-off frequency and a current consumption which is not too high at a square-wave voltage of 50 Hz, a transformer of this kind must have an inductance $L_H > 500$ mH. At the same time, the upper cut-off frequency must be approximately equal to 5 MHz. Both requirements have to be satisfied in conformity with the safety requirements.

For a transformer of this kind it is known to use a ferrite shell core without air gap, having an effective permeability $\mu_e > 2000$. Both transformer windings are then bifilarly wound in common, one layer after the other. A drawback of this transformer construction, however, is that the wires of the primary as well as of the secondary coil have to be coated with an insulating layer of polytetrafluoroethylene so as to obtain an appropriate breakdown voltage. This insulating layer cannot be provided in the form of a lacquer layer, but is formed by wrapping with fine threads of polytetrafluoroethylene, which is very expensive. Consequently, the simple construction of a transformer of this kind is opposed by extremely high material costs.

The invention has for its object to provide a method of winding a transformer in which lacquer-insulated wires can be used, without additional requirements being imposed on the lacquer insulation.

According to the invention this object is achieved in that at least one primary and at least one secondary layer of turns is alternately wound, the wires for the primary and for the secondary coil being unwound from separate storage reels, whilst during the time in which one layer of turns is wound on the previous layer of turns, covered with an insulating intermediate layer, the wire of the previous layer of turns is further wound to form an auxiliary layer adjacent to the transformer to be wound, the said wire wound adjacent to the transformer being used for winding a subsequent layer of turns at a later stage.

As the primary and the secondary winding are alternately wound in layers, the required extremely strong magnetic coupling between the two coils is realized. Because only very small voltage differences can occur between the turns of the individual layers of turns, a breakdown between two adjacently arranged turns of this kind is virtually precluded. Larger voltage differences can occur only between the stacked layers of the primary and the secondary winding. These layers, however, are isolated from each other by insertion of a high-quality insulating intermediate layer, so that no breakdown can occur. The breakdown voltage on the junctions between the layers can be additionally increased by means of a sprayed insulating matter.

The invention not only permits of the use of a simple enamelled copper wire, but also the winding of the primary and the secondary windings without the wire having to be interrupted at the ends of the layers.

According to an advantageous embodiment of the method according to the invention the layers of the coils are always wound in the same winding sense and at the same direction of rotation of the winding mandrel, whilst at the reverse direction of rotation of the winding mandrel the winding of the layers is always interrupted, only auxiliary windings being wound or unwound adjacent to one or both ends of the transformer during this period. Due to the continuous winding in the same sense, the copper filling factor is improved and the reversal of the direction of rotation of the winding mandrel makes it possible to wind the auxiliary layers such that the layers of the primary and secondary windings can continuously alternate, without the wires having to be interrupted.

In a further advantageous embodiment of the invention, winding is effected such that after an auxiliary winding has been wound, which is always started directly adjacent to a layer of turns, the auxiliary winding is always immediately unwound, the unwound wire then being rewound onto the storage reel. By rewinding the winding wire onto the relevant storage reel it is achieved that the wire remains tensioned during the entire winding process, so that difficulties associated with reduced wire tension can be avoided during winding.

For spraying as well as for insertion between the individual layers use can be made of the insulating material polytetrafluoroethylene, either in the form of a spray or in the form of a foil.

For performing the method according to the invention, use is made of a device comprising a winding mandrel and storage reels for the winding wires, characterized in that the winding mandrel is extended by at least the length of the winding space on both sides of a coil former arranged on the winding mandrel, or of the winding space on the winding mandrel, the portions of the winding mandrel situated on both sides of the winding space being suitable for accommodating auxiliary windings. The winding mandrel thus accommodates the auxiliary windings during winding or rewinding, respectively.

In a further embodiment of the device according to the invention, the storage reels are connected to a continuously operating drive unit such that the drive unit operates as a brake during unwinding of the wire. To this end, the storage reels may be connected to the drive unit, for example, via a slip coupling. The drive unit may also consist of an asynchronous motor having a substantial slip. In all these drive methods the wire on the winding reels is exposed to a permanent tensile force, independent of whether the wire is being unwound from the reels or is being rewound thereon.

According to a further embodiment of the device according to the invention, the coil former which is slid onto the winding mandrel comprises flanges which are provided with diametrically opposed cut-outs. By feeding the winding wire through these cuts-outs and by reversing the direction of rotation of the winding mandrel, the winding sense of the winding wire can be reversed for making auxiliary windings.

Finally, according to a further embodiment yet of the invention the coil former may be dispensed with and the wire may be wound directly onto the winding mandrel. Guide pins are arranged on the winding mandrel, for guiding the winding wire and for limiting the layers of turns in the axial direction.

Figure 2:
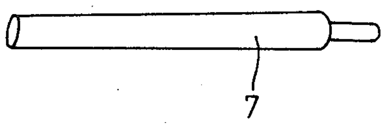

In order that the invention may be readily carried into effect, some embodiments thereof will now be described in detail, by way of example, with reference to the accompanying diagrammatic drawings, in which:

FIG. 1 shows a coil former for a transformer to be manufactured by using the method according to the invention, FIG. 2 shows a winding mandrel for winding the transformer, FIGS. 3 to 8 show successive winding stages for illustrating the winding according to the invention.

In FIG. 1 the coil former for a transformer according to the invention consists of a tube 1 which can be slid onto a shell core, flanges 3 being provided on the ends of the said tube. On diametically opposed ends the flanges 3 are provided with cut-outs 5, the purpose of which will be described hereinafter. The winding mandrel 7 shown in FIG. 2 has a somewhat conical shape and its length is approximately four times as large as that of the coil former shown in FIG. 1.

The winding mandrel is secured in a winding device shown only schematically in FIGS. 3 to 8 in which it can rotate both clockwise and counterclockwise. The storage reels 9, 11 shown in FIG. 5 contain a supply of enamelled copper wire having a diameter of, for example, 0.15 mm. Each storage reel 9, 11 is rotated by an asynchronous motor 13 in a direction such that the wire is wound onto the reel. Each asynchronous motor acts, by means of a friction drive, for example, on a flange of the storage reels. It is obvious that a different coupling, dependent of an external force between the storage reel and the asynchronous motor is also possible. The asynchronous motors are chosen to be such that they merely slow down the unwinding process when the copper wire is pulled off the storage reel, i.e., at a forced movement of the storage reels and hence of the shaft of the asynchronous motor.

Figure 3:
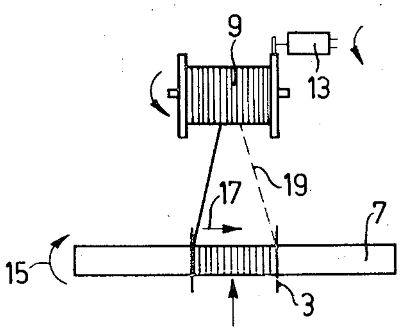

For winding the first layer of turns of the primary winding, the winding wire of the storage reel 9 is wound from left to right onto the coil former which is slid onto the winding mandrel. The first layer of turns consists of, for example, 52 turn. As is shown in FIG. 3, the winding mandrel is rotated in the direction of an arrow 15 during winding, and the turns of the first layer of turns succeed each other in the direction of an arrow 17. The motor 13 in this case acts as a brake. When the first layer of turns has been completed, the supplied winding wire extends from the storage reel 9 to the flange 3 of the coil former as denoted by the broken line 19.

Figure 4:
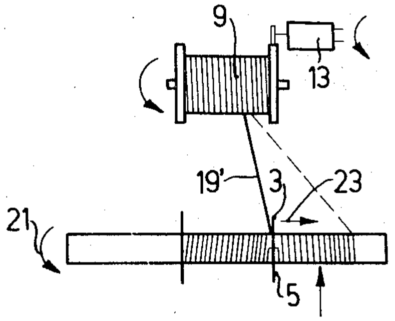

As is shown in FIG. 4, the wire 19 is subsequently fed through a cut-out 5. At the same time the direction of rotation of the winding mandrel is reversed so that the mandrel now rotates in the direction of the arrow 21. The winding wire, denoted in FIG. 3 by 19, is denoted in FIG. 4 by 19' and is shown as a solid line. In all further drawings the winding wire is denoted by a solid line at the start of the winding of a layer, whilst for the purpose of distinction the position of the winding wire upon completion of the winding of the layer is denoted by a broken line. The direction of rotation of the storage reel 9 remaining the same, the winding wire is wound onto the winding mandrel on the right of the coil former in the direction of an arrow 23. Again 52 turns are wound onto the winding mandrel on the right of the coil former. Present on the winding mandrel are then the first layer of turns of the primary winding and, on the right thereof, an auxiliary winding having the same number of turns.

Figure 5:
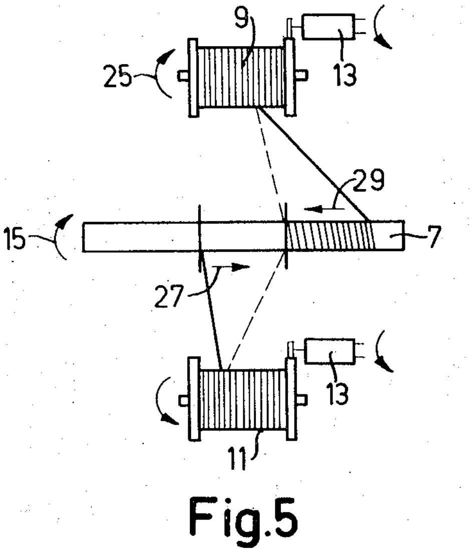

In the subsequent winding step shown in FIG. 5, the direction of rotation of the storage reel 9 is reversed, as is denoted by the arrow 25. The storage reel then rotates in a direction in which the wire is wound and the motor 13 acts as a drive motor. Before the winding according to FIG. 5 is started, however, the direction of rotation of the winding mandrel 7 is also reversed in accordance with the direction of rotation 15 in FIG. 3. If the winding wire of the primary coil is fed into an upper cut-out 5 at the start of winding according to FIG. 3, the beginning of the wire of the secondary winding is then inserted into a lower cut-out 5'. Finally, a foil of polytetrafluoroethylene is provided around the first layer of turns of the primary winding. The preparations for winding the first layer of turns of the secondary winding have thus been completed, and the winding mandrel is brought to rotation in the direction of the arrow 15. The first layer of turns of the secondary winding is then wound onto the coil former in the direction of an arrow 27. At the same time, the auxiliary winding on the right of the coil former is unwound again in the direction of an arrow 29, and is rewound onto the storage reel 9.

Figure 6:
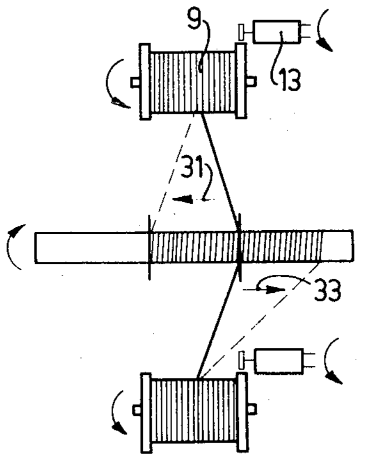

As is shown in FIG. 6, winding is continued, without the direction of rotation of the winding mandrel being reversed, after a suitably insulating synthetic resin foil of tetrafluoroethylene has been provided on the first layer of turns of the secondary coil. During winding according to FIG. 6, a second layer of turns of the primary coil is wound from the storage reel 9 onto the coil former from right to left in the direction of an arrow 31. At the same time, an auxiliary winding of the secondary coil is wound on the right of the coil former in the direction of an arrow 33.

When all 52 turns of the layer of turns and the auxiliary winding have been provided on the winding mandrel as shown in FIG. 6, the direction of rotation of the winding mandrel is reversed. For the further winding the wire from storage reel 9, denoted in FIG. 7 by the reference 34, is guided through the cut-out 5 in the left-hand flange of the coil former. In a reversed direction of rotation of the winding mandrel 7, in the direction of the arrow 21, an auxiliary winding is wound of the wire of the primary coil on the left of the coil former in the direction of an arrow 35, whilst on the right-hand side of the coil former the previously wound auxiliary winding of the wire of the secondary winding on the right is rewound onto the storage reel 11 in the direction of an arrow 37. In this case the motor 13 of the storage reel 9 acts as a brake, whilst the motor 13 of the storage reel 11 has a driving function. During winding according to FIG. 7, the winding mandrel 7 then rotating in the direction of the arrow 21, no layer of turns is provided on the coil former itself.

Figure 7:
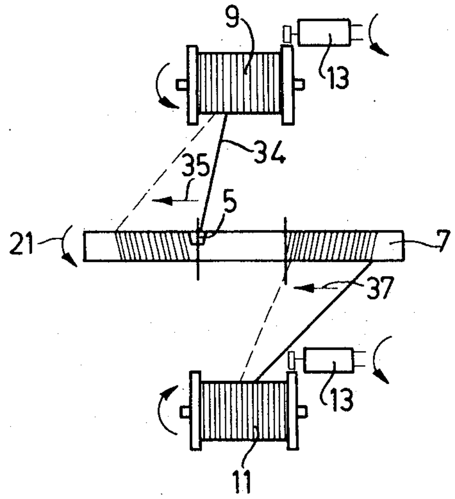
Figure 8:
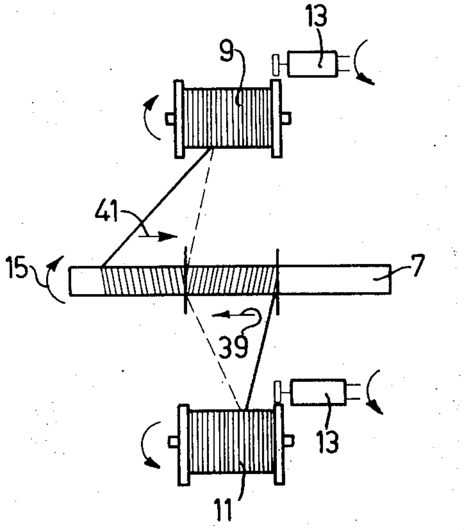

Another layer of turns is provided in a subsequent step which is shown in FIG. 8. The direction of rotation of the winding mandrel is again reversed and corresponds to the winding direction 15 shown in FIG. 3. The winding according to FIG. 8 commences after an insulating foil has been provided on the second layer of turns of the primary winding. The second secondary layer of turns is then provided on the coil former in the direction of an arrow 39. At the same time the auxiliary winding of the wire of the primary coil, provided on the left in accordance with FIG. 7, is unwound from the winding mandrel in the direction of an arrow 41 and is rewound onto the storage reel 9.

The further winding steps are mirror images of the winding steps shown in FIGS. 6, 7 and 8.

It is thus possible to wind a transformer which statisfies the requirements imposed on a matching transformer and which has no joints after each layer of turns. The major advantage is that use can be made of a normal enamelled copper wire, which has proven to be very economical. In order to ensure that no breakdowns can occur on the ends of the layers, the ends are preferably sprayed with a spray so that an appropriately insulating matter such as tetrafluoroethylene is provided on the coil ends.

If desired, a coil former may be dispensed with if the winding space of the coil is limited in another manner and if, in particular in the area near the ends of the winding space, reversing points for the winding wire are provided on both sides of the winding space. This can be realized by providing guide pins in the winding mandrel on both sides of the winding space, the coil wires being guided about the said pins upon reversal of the winding direction.

What is claimed is:

1. A method of winding a transformer having primary and secondary coils wound one over the other with insulating intermediate layers comprising the steps of alternately winding at least one primary layer and at least one secondary layer of turns onto a winding mandrel, the wires for the primary and secondary coil being unwound from separate storage reels, covering the layer of turns with an insulating intermediate layer, winding an auxiliary winding adjacent the transformer being wound with the wire of a previous layer of turns during the winding of the next layer onto said previous layer, and using the wire of said auxiliary winding for winding a subsequent layer of turns onto said transformer.

2. The method according to claim 1 wherein the winding of said layers of the coils is in the same winding sense and in the same direction as the direction of rotation of said winding mandrel, said winding of the layers being interrupted when in the reverse direction of rotation of the winding mandrel, only auxiliary windings being wound and unwound adjacent to one or both ends of the transformer during this period.

3. The method according to claim 1 wherein said auxiliary winding adjacent the layer of coil turns is immediately unwound after it has been completed, the unwound wire of said auxiliary winding being rewound onto the storage reel.

4. The method according to claim 1 further comprising the step of spraying the junctions between the layers with an insulating material.

5. The method according to claim 4 wherein said insulating material is polytetrafluoroethylene.

* * * * *

PO-1050
(5/69)

UNITED STATES PATENT OFFICE
CERTIFICATE OF CORRECTION

Patent No. 3,801,029 Dated April 2, 1974

Inventor(s) DIETER MALBURG

It is certified that error appears in the above-identified patent and that said Letters Patent are hereby corrected as shown below:

In the heading:

Under "Foreign Application Priority Data"

"2106258" should be --2106258.8--

Signed and sealed this 17th day of September 1974.

(SEAL)
Attest:

McCOY M. GIBSON JR.
Attesting Officer

C. MARSHALL DANN
Commissioner of Patents